US011036557B2

(12) United States Patent
Iyer (10) Patent No.: US 11,036,557 B2
(45) Date of Patent: *Jun. 15, 2021

(54) DYNAMIC TRANSACTION-PERSISTENT SERVER LOAD BALANCING

(71) Applicant: Hewlett Packard Enterprise Development LP, Houston, TX (US)

(72) Inventor: Pradeep Iyer, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/211,765

(22) Filed: Dec. 6, 2018

(65) Prior Publication Data

US 2019/0114207 A1   Apr. 18, 2019

Related U.S. Application Data

(63) Continuation of application No. 13/095,705, filed on Apr. 27, 2011, now Pat. No. 10,169,094.

(51) Int. Cl.
| | | |
|---|---|---|
| *G06F 9/50* | (2006.01) | |
| *H04L 29/08* | (2006.01) | |
| *H04L 29/06* | (2006.01) | |

(52) U.S. Cl.
CPC .......... *G06F 9/505* (2013.01); *H04L 67/1029* (2013.01); *H04L 63/0892* (2013.01); *H04L 67/1008* (2013.01)

(58) Field of Classification Search
CPC . G06F 9/505; H04L 67/1002; H04L 67/1008; H04L 67/1029; H04L 63/0892
See application file for complete search history.

(56) References Cited

U.S. PATENT DOCUMENTS

| | | | | |
|---|---|---|---|---|
| 5,519,772 A | * | 5/1996 | Akman | .................... H04M 3/51 379/221.08 |
| 6,324,580 B1 | | 11/2001 | Jindal et al. | |
| 6,327,622 B1 | * | 12/2001 | Jindal | .................... G06F 9/5055 709/228 |
| 6,442,165 B1 | * | 8/2002 | Sitaraman | ............... G06F 9/505 370/395.4 |

(Continued)

*Primary Examiner* — John M MacIlwinen
(74) *Attorney, Agent, or Firm* — Hewlett Packard Enterprise Patent Department (57) ABSTRACT

The present disclosure describes a system for dynamic transaction-persistent server load balancing. The disclosed system receives a client request associated with a new transaction. In response to receiving the client request, the system dynamically infers relative capacities of a plurality of servers coupled to the device in a network. In particular, the system maintains a set of variables corresponding to the servers. Each variable indicates a number of outstanding requests transmitted from the device to a respective server. The system infers relative server capacities and transmission latencies between the device and the servers based on a comparison of current values of the variables. The system identifies and selects a server associated with high capacity or low transmission latency between the device and the server relative to one or more other servers, and transmits an outstanding request corresponding to the client request from the new transaction to the identified server.

18 Claims, 9 Drawing Sheets

(56) References Cited

U.S. PATENT DOCUMENTS

| | | | |
|---|---|---|---|
| 6,560,717 B1* | 5/2003 | Scott | G06F 9/505 |
| | | | 714/4.1 |
| 6,922,724 B1 | 7/2005 | Freeman et al. | |
| 7,082,122 B2 | 7/2006 | Pan | |
| 7,447,166 B1 | 11/2008 | Kaluve et al. | |
| 7,606,916 B1* | 10/2009 | Potter | G06F 9/505 |
| | | | 709/227 |
| 7,640,023 B2 | 12/2009 | Ma et al. | |
| 7,676,561 B1 | 3/2010 | Rai et al. | |
| 7,711,956 B2 | 5/2010 | Kinoshita et al. | |
| 7,900,040 B2 | 3/2011 | Brendel | |
| 8,161,252 B1 | 4/2012 | Case et al. | |
| 2002/0032777 A1 | 3/2002 | Kawata et al. | |
| 2003/0046396 A1 | 3/2003 | Richter et al. | |
| 2004/0143660 A1 | 7/2004 | Dimitroff et al. | |
| 2004/0168054 A1 | 8/2004 | Halasz et al. | |
| 2004/0208151 A1* | 10/2004 | Haverinen | H04L 61/10 |
| | | | 370/338 |
| 2008/0034111 A1* | 2/2008 | Kamath | H04L 67/1008 |
| | | | 709/238 |
| 2009/0083861 A1 | 3/2009 | Jones | |
| 2009/0265467 A1 | 10/2009 | Peles | |
| 2011/0040845 A1 | 2/2011 | Cai et al. | |
| 2011/0078285 A1 | 3/2011 | Hawkins et al. | |
| 2011/0078303 A1* | 3/2011 | Li | H04L 67/1012 |
| | | | 709/224 |
| 2012/0066371 A1 | 3/2012 | Patel et al. | |

\* cited by examiner

| Time 520 | Number of Outstanding Requests at AS1 540 | Number of Outstanding Requests at AS2 560 | AS Selection 580 |
|---|---|---|---|
| $t_1$ | 0 | 0 | |
| $t_2$ | 1 | 0 | AS1 |
| $t_5$ | 0 | 0 | |
| $t_6$ | 0 | 0 | |
| $t_9$ | 0 | 0 | |
| $t_{10}$ | 0 | 0 | AS1 |
| $t_{13}$ | 1 | 0 | |
| $t_{14}$ | 1 | 1 | AS2 |
| $t_{17}$ | 0 | 1 | |
| $t_{19}$ | 0 | 1 | |
| $t_{20}$ | 1 | 1 | AS1 |
| $t_{22}$ | 1 | 1 | |
| $t_{26}$ | 1 | 0 | |
| $t_{27}$ | 1 | 0 | |

DYNAMIC TRANSACTION-PERSISTENT SERVER LOAD BALANCING

BACKGROUND

The present disclosure relates to server load balancing in a wireless network, and in particular, one embodiment of the disclosure relates to dynamically load balancing transaction-persistent requests among a set of authentication servers.

Persistence (also known as "stickiness"), in the context of server load balancing, is preserved by transmitting requests associated with the same transaction to the same server for handling.

Conventionally, server load balancing follows a round robin (RR) approach. In a simple round robin, a load balancer transmits to each server transaction-persistent requests in a periodically repeated order. For example, assuming that a distributed system includes three authentication servers, such as, AS1, AS2, and AS3, the load balancer will always transmit transaction-persistent requests to the authentication servers according to the following order—AS1, AS2, AS3, AS1, AS2, AS3, AS1, . . . . Thus, the simple round robin algorithm does not take into account capacities of the authentication servers.

A weighted round robin (WRR) is similar to the simple round robin, but assigns weights to the authentication servers based on their capacities. In the above example, assuming that the capacities of AS1, AS2, and AS3 are 4, 2, and 2, respectively, the load balancer will assign weights 2, 1, 1 to AS1, AS2, and AS3 accordingly. Thus, with the weighted round robin, the load balancer will transmit transaction-persistent requests to the authentication servers according to the following order—AS1, AS1, AS2, AS3, AS1, AS1, AS2, . . . . However, WRR requires knowledge of the server capacities. Moreover, both simple RR and WRR are static scheduling approaches that do not consider dynamic real-time transmission latency in a network.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the invention as claimed.

The present disclosure supports dynamic transaction-persistent server load balancing based on the number of outstanding requests associated with each server in a server group. First, the disclosed system receives a client request associated with a new transaction. The system dynamically infers relative capacities of the servers in the group by comparing the numbers of outstanding requests. As an example, when server A has 3 outstanding requests and server B has 5 outstanding requests at a given time, the system can infer that server A has higher relative capacity than server B. Server A is inferred to have higher relative capacity than server B, because server A having fewer outstanding requests than server B suggests that, at the given time when the numbers of outstanding requests are compared, server A has relatively more processing power than server B to handle the next outstanding request regardless of the absolute capacity of each server. The system selects a server from the group of servers based on the inferred capacities of the servers, and transmits to the selected server a request corresponding to the received client request from the new transaction. Further, after the server is selected for the new transaction, all subsequent requests within the same transaction will also be transmitted to the selected server. Thus, the system supports transaction-persistent requests, because the load balancing decisions, e.g., the identification and the selection of a server in the server group to transmit requests, are made at the time when a new transaction is initiated by a client.

Specifically, embodiments of the present disclosure may include multiple authentication servers in a network that support Remote Authentication Dial-in User Service (RADIUS) protocol. The RADIUS servers authenticate users or devices before granting them access to the network, authorize the users or devices for network services, and account for usage of the authorized services. The authentication may comply with any network authentication protocol, such as Institute of Electrical and Electronics Engineers (IEEE) 802.1X protocol. An 802.1X authentication transaction typically involves three parties: a suppliant, an authenticator, and an authentication server. One or more access points or controllers in a wireless network, or switches in a wired network, which act as the authenticator in the 802.1X authentication transaction and communicate to the RADIUS servers as Network Access Server (NAS) clients, can perform the dynamic transaction-persistent server load balancing as described herein. Also, the RADIUS servers act the authentication server in the 802.1X transaction.

The outstanding requests for a given server include all previously transmitted requests to the server, as long as (1) the requests have not expired, and (2) no responses corresponding to the requests have been received from the server. It is important to note that a transaction, which an authentication client initiates, may include one or more requests and zero or more responses. Also, it is possible that, during certain time periods within a transaction, all previously transmitted requests to the server have either expired or already associated with the corresponding responses received from the server. In such cases, the number of outstanding requests for the server would be zero during these time periods, although the transaction has not been completed. Thus, depending on the configuration of the system, the number of outstanding requests may or may not be correlated to the number of the transactions.

Furthermore, if a server has a relatively large capacity, and/or if the transmission latency between a host network device and the server is relatively low, the number of outstanding requests corresponding to that server would tend to remain relatively low. Note that the relative capacities of the server and the transmission latencies are impacted by dynamic factors that change their values in real-time, such as, the server downtime, the network traffic between the host device and the server, etc. Thus, by comparing the number of outstanding requests associated with each server in the server group, the disclosed system can dynamically infer the relative capacities of the servers, and transmission latencies between a host network device and the servers in the group. The system can identify or select servers with relatively high capacity and low transmission latency to the host network device based on inferred information. The system then transmits requests from a new transaction to the selected server, thereby performing dynamic transaction-persistent load balancing.

Computing Environment

Figure 1A:
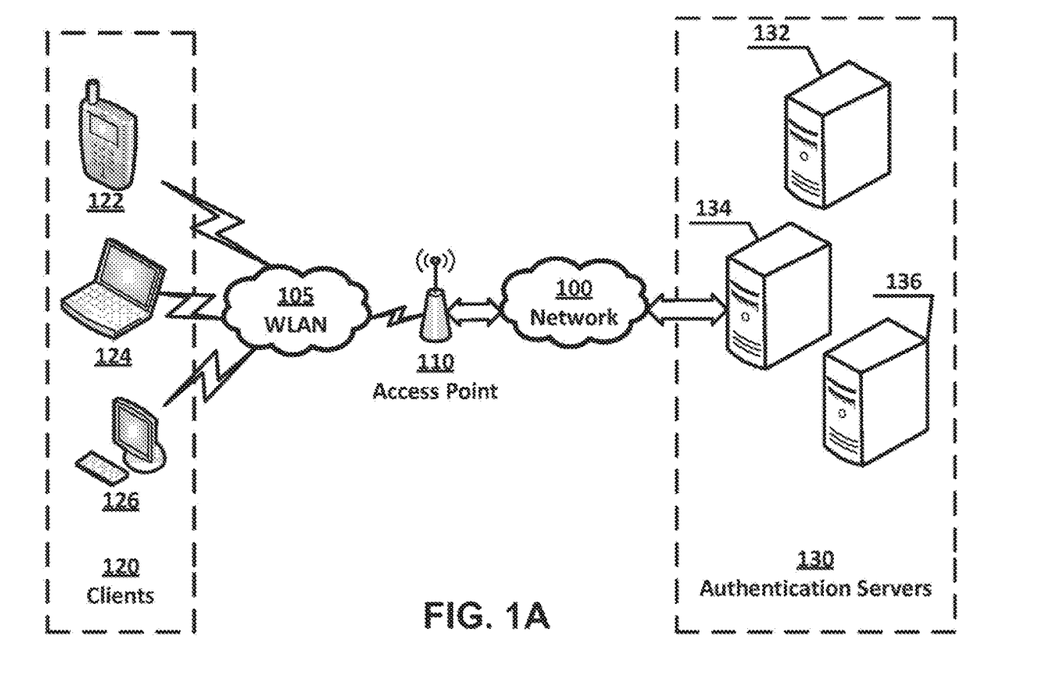
FIGS. 1A-1C are block diagrams illustrating examples of computing network environments according to embodiments of the present disclosure.

FIG. 1A is a block diagram illustrating an example of a computing network environment according to one embodiment of the present disclosure. FIG. 1A includes network 100, wireless local area network (WLAN) 105, access point 110, multiple clients 120 (including, for example, client 122, client 124, client 126, etc.), and multiple authentication servers 130 (including, for example, authentication server 132, authentication server 134, authentication server 136, etc.).

In the example illustrated in FIG. 1A, network 100 couples one or more access point 110 to a group of authentication servers 130 (e.g., authentication servers 132-136). Although only one access point 110 is depicted in FIG. 1A, it should be noted that the disclosed system can include multiple access points that are either centrally located or distributed in network 100. Network 100 may be any type of wired or wireless network. Access point 110 is coupled with clients 120 over WLAN 105 through any commonly supported wireless communication technology.

Access point 110 is a hardware unit that acts as a communication node by linking wireless mobile stations such as PCs to a wired backbone network. Access point 110 may generally broadcast a service set identifier (SSID). Access point 110 may connect client devices or users to other devices or users in the network, and may serve as a point of connection between WLAN and a wired network. Access point 110 may have one or more radios. The radios may be configured to support various wireless communication standards. In particular, the radios may include multiple antennas to support multiple-input and multiple-output (MIMO) technology as used in Institute of Electrical and Electronics Engineers (IEEE) 802.11n wireless networking standards (WiFi), Worldwide Interoperability for Microwave Access standards (WiMAX), 4th Generation cellular wireless standards (4G), 3rd Generation Partnership Project Long Term Evolution (3GPP LTE), and Evolved High-Speed Packet Access (HSPA+).

In one embodiment, access point 110 performs all media access control (MAC) processing functions, such as, terminating the wireless transmission data and management protocols, translating data between the wired and wireless portions of the network, maintaining statistical information regarding wireless clients and the radio environment, etc.

Clients 120 may be any computing device that includes a communication port, which is capable of WLAN communications. For example, clients 120 can be, but are not limited to, a smart mobile phone 122, a laptop or tablet computing device 124, a desktop or work station 126, etc.

Authentication servers 130 are computing devices hosting applications that facilitate authentication of a client device or a user attempting to access a network. Such device can include, but is not limited to, a computer system, a switch, an access point, or a network access server. Authentication generally refers to the process of determining whether a client user or a client device is in fact who or what it declares itself to be. Authentication servers 130 may use authentication methods based on User Datagram Protocol (UDP), such as Remote Authentication Dial-in User Service (RADIUS), or authentication methods based on Transmission Control Protocol (TCP) such as Terminal Access Controller Access Control System Plus (TACACS+).

Figure 1B:
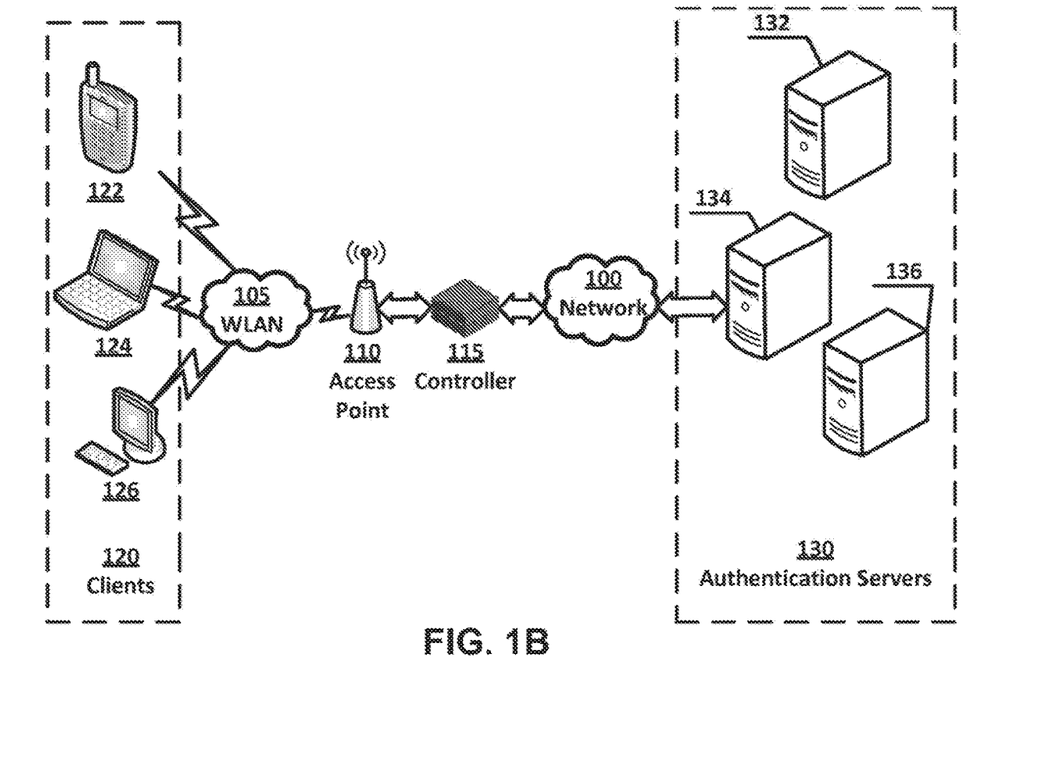

FIG. 1B is a block diagram illustrating another variation of a computing network environment example. FIG. 1B includes network 100, wireless local area network (WLAN) 105, access point 110, controller 115, multiple clients 120 (including, for example, client 122, client 124, client 126, etc.), and multiple authentication servers 130 (including, for example, authentication server 132, authentication server 134, authentication server 136, etc.).

In the example illustrated in FIG. 1B, network 100 couples one or more controllers 115 to a group of authentication servers 130 (e.g., authentication servers 132-136). Further, each controller 115 is coupled to one or more access points 110. Although only one access point 110 and one controller 115 is depicted in FIG. 18B, it should be noted that the disclosed system can include multiple controllers 115 that are either centrally located or distributed in network 100. Moreover, one controller 115 can be coupled to multiple access points 110. Also, access points 110 are coupled with clients 120 over WLAN 105 through any commonly supported wireless communication technology.

In the embodiment described in FIG. 1B, access point 110 and controller 115 split the MAC processing. Access point 110 may handle a portion of MAC functions, such as, frame exchange handshake between a client user or device 122, 124, or 126 and access point 110, transmission of beacon frames, buffering frames for power conservation of clients 120, response to Probe Request frames from clients 120, monitoring radio channels, layer 2 encryption, etc. Other MAC functions can be processed by controller 115. For example, controller 115 may be configured to process user/device authentication, frame translation and bridging, association and de-association of clients 120, etc.

It should be noted that the split of MAC functions described above is by way of example only. The disclosed system can be configured to split the MAC functions differently. Also, access point 110 and controller 115 may be integrated in a single device, or maybe physically separated and coupled through a wireless or wired network.

Figure 1C:
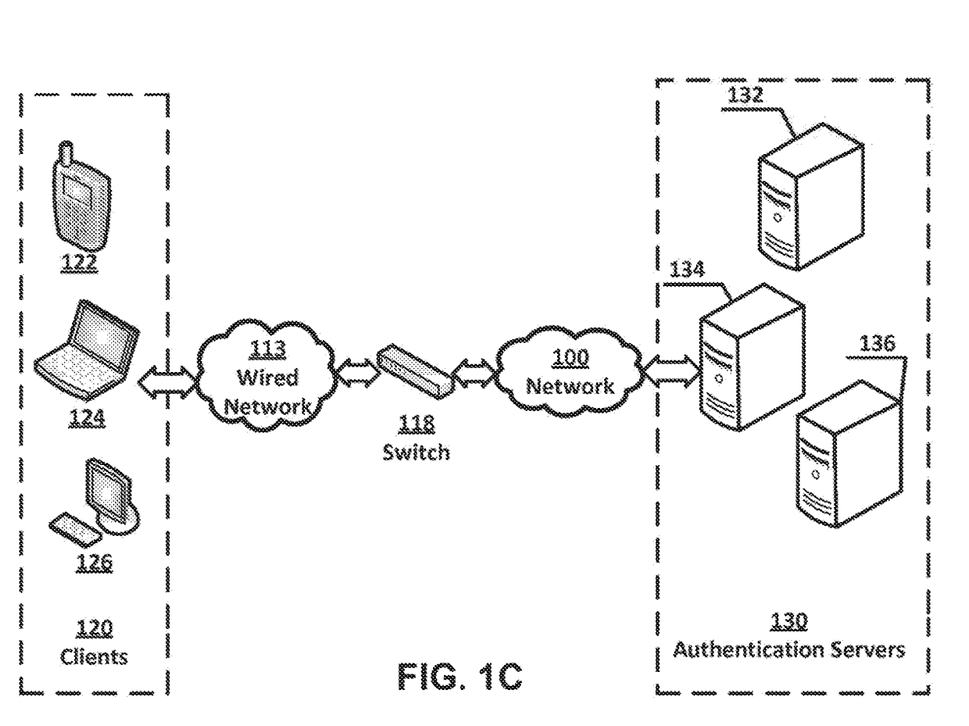

FIG. 1C is a block diagram illustrating yet another variation of an example computing network environment. FIG. 1C includes network 100, wired network 113, access point 110, switch 118, multiple clients 120 (including, for example, client 122, client 124, client 126, etc.), and multiple authentication servers 130 (including, for example, authentication server 132, authentication server 134, authentication server 136, etc.).

In the example illustrated in FIG. 1C, network 100 couples one or more switches 118 to a group of authentication servers 130 (e.g., authentication servers 132-136). Further, each switch 118 is coupled to one or more access points 110. Although only one switch 118 is depicted in FIG. 1C, it should be noted that the disclosed system can include multiple switches 118 that are either centrally located or distributed in network 100. Moreover, switches 118 are coupled with clients 120 over a wired network, such as Ethernet 113.

Switch 118 can be any network device that performs data forwarding tasks. Switch 118 may function as a bridge, or a router, and forward frames, packets, or other data units. Moreover, switch 118 can perform enhanced functions, such as device/user authentication, authorization, and/or accounting, access control list filtering, differentiated quality of service prioritization, link monitoring and failure detection, etc.

FIGS. 1A-1C are provided herein for illustration purposes only. Various embodiments of the disclosure may exist without departing from the spirit of the disclosure. For example, a device or a virtual device other than a controller or a switch may be deployed in the system to communicate with the access point(s) or to replace the access point(s). Such device or virtual device is coupled to the authentication servers through network and is capable of processing user and/or device authentication for the clients.

RADIUS Protocol

The disclosed system may be configured to use various authentication protocols. As described above, one of the commonly used authentication protocols is Remote Authentication Dial-In User Service (RADIUS).

Transactions between a user and a RADIUS server are authenticated through the use of a shared secret which is not transmitted over network. In addition, only encrypted user passwords are transmitted between the user and the RADIUS server. The RADIUS server can support a variety of methods to authenticate the user, including but not limited to, Point-to-Point Protocol Password Authentication Protocol (PPP PAP), Challenge-Handshake Authentication Protocol (CHAP), and other authentication mechanisms. In some embodiment, the authentication methods comply with IEEE 802.1X standard for port-based network access control (PNAC).

Figure 2:
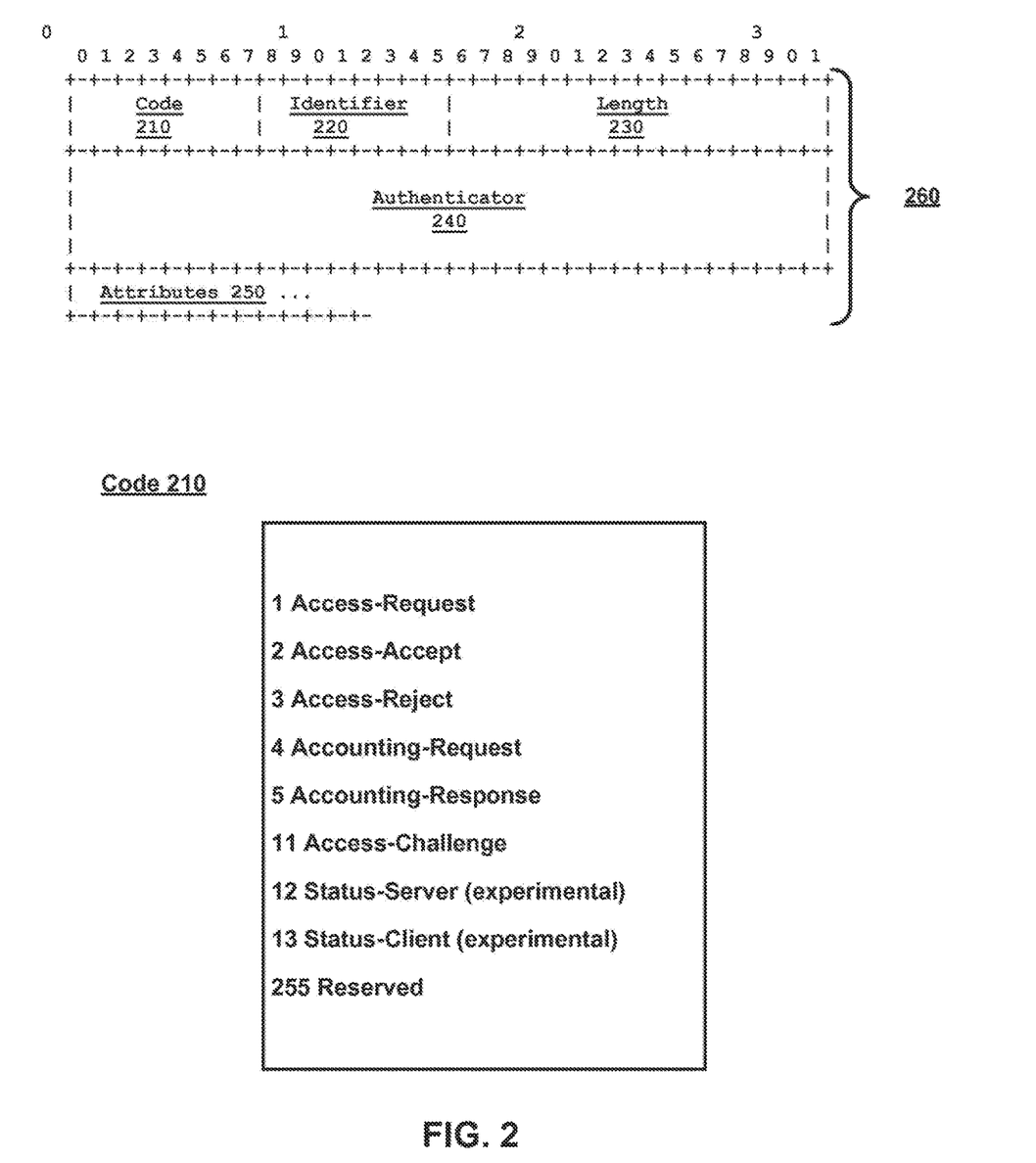
FIG. 2 is a diagram illustrating an example RADIUS packet and types of RADIUS packet according to embodiments of the present disclosure.

The RADIUS protocol uses UDP as its transport protocol. One RADIUS packet is encapsulated in the UDP data field. FIG. 2 is a diagram illustrating an example data format of a RADIUS packet 260 and different types of the RADIUS packet. In this example, RADIUS packet 260 includes an 8-bit code field 210 (which identifies the type of the RADIUS packet), an 8-bit identifier field 220 (which facilitates matching between requests and responses), a 16-bit length field 230 (which indicates the length of the RADIUS packet), a 16-byte authenticator field 240 (which is used for authentications), and an attributes field 250 that can have a variable length.

RADIUS code 210 includes selected examples of values for the code field in RADIUS packet 260. For example, a code value 1 indicates that RADIUS packet 260 is an Access-Request packet; a code value 2 indicates that RADIUS packet 260 is an Access-Accept packet; a code value 3 indicates that RADIUS packet 260 is an Access-Reject packet; a code value 4 indicates that RADIUS packet 260 is an Accounting-Request packet; a code value 5 indicates that RADIUS packet 260 is an Access-Response packet; a code value 11 indicates that RADIUS packet 260 is an Access-Challenge packet; etc.

Figure 3:
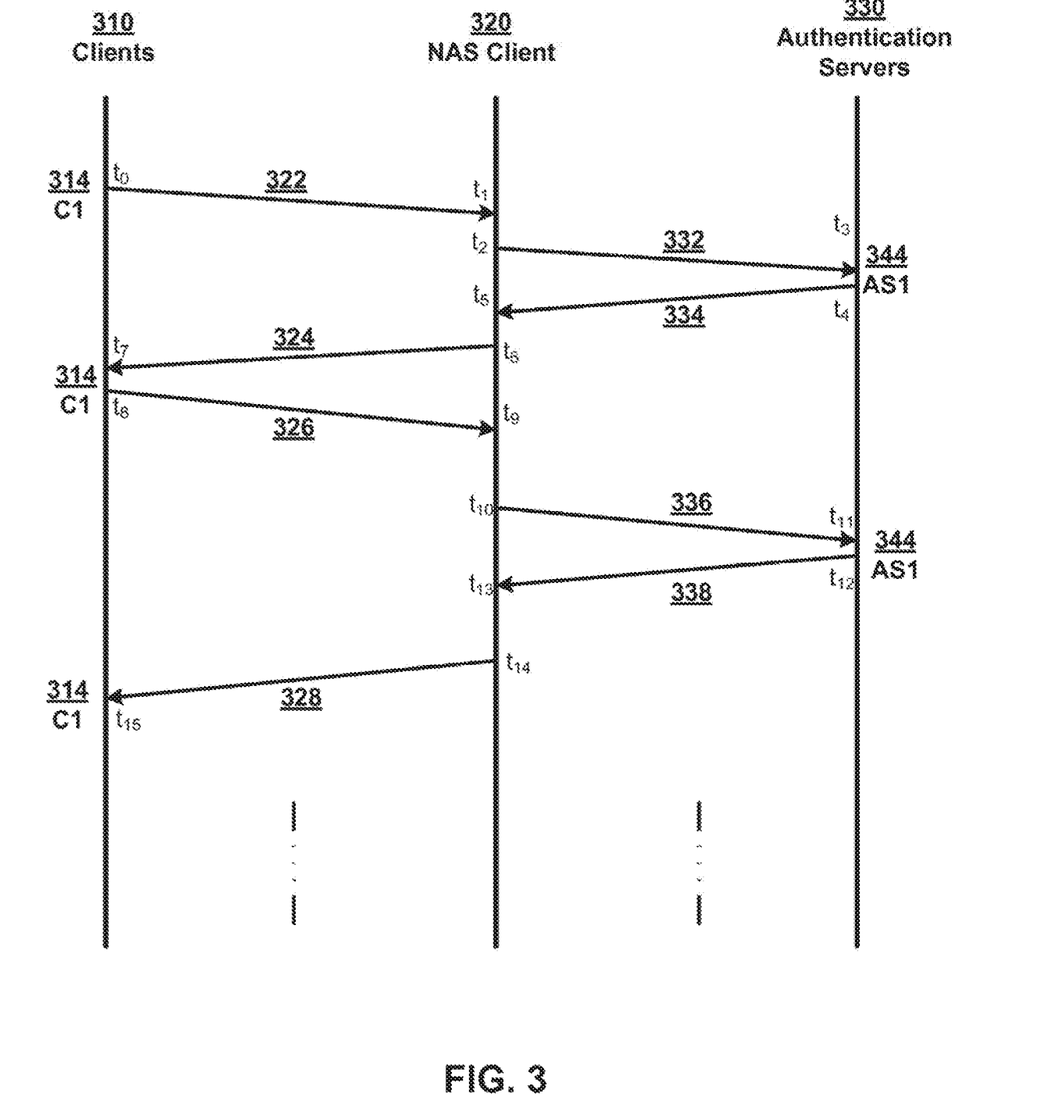
FIG. 3 is a sequence diagram illustrating RADIUS protocol according to embodiments of the present disclosure.

FIG. 3 illustrates an example of communication exchanges under the RADIUS protocol. Communication exchanges under the RADIUS protocol typically involve three parties: a suppliant (e.g., clients 310), an authenticator (e.g. NAS client 320), and an authentication server (e.g., authentication servers 330). For example, a Network Access Server (NAS) can operate as a client (i.e., authenticator) of a RADIUS server (i.e., authentication server). NAS client 320 can be an access point, a controller, a switch, or any other device, which is coupled to authentication servers 330 through network, and which is capable of processing user and/or device authentication for clients 310. NAS client 320 is responsible for passing user authentication information received from client 310 to designated RADIUS servers in a group of authentication servers 330, and then acting on responses returned from the RADIUS servers. Authentication servers 330 are responsible for receiving requests from NAS clients, performing authentication, and returning configuration information for NAS client 320 to deliver service to clients 310. Further, authentication servers 330 can act as a proxy server to other RADIUS servers or to other kinds of authentication servers.

During operations, a client. C1 314, initiates an authentication transaction, and transmits client request 322 to NAS client 320 at time $t_0$. Client request 322 is received by NAS client 320 at time $t_1$. NAS client 320 subsequently creates a corresponding Access-Request packet, and transmits Access-Request packet 332 to RADIUS authentication server, AS1 344, at time $t_2$. Access-Request packet 332 may contain such attributes as user C1 314's name, user C1 314's password, NAS client 320's identifier, and a NAS Port ID corresponding to a port via which user C1 314 accesses NAS client 320. The password can be hidden using methods RSA-based algorithms.

In some embodiments, if no response is returned within an expiration period, request 332 is retransmitted to AS1 344. If NAS client 320 still receives no response from AS1 344 after a number of retransmissions, it can also forward request 332 to another RADIUS server in a server group. Alternatively, alternative RADIUS servers in the server group can be selected for retransmissions in accordance to various load balancing algorithms.

At time $t_3$, the RADIUS server, AS1 344, receives request 332. AS1 344 validates NAS client 320 that transmits request 332. Any request from NAS client 320 for which the RADIUS server, AS1 344, does not have a shared secret will be silently discarded. If NAS client 320 is valid, the RADIUS server, AS1 344, consults a database including user information to find a user entry, the user name of which matches the user name of C1 314 as included in request 332. The user entry in the database contains a list of requirements that must be met to allow access for user C1 314. In some embodiments, the RADIUS server, AS1 344, verifies user's password. In other embodiments, the RADIUS server verifies the NAS client ID and/or the NAS client's port ID to determine whether the user is allowed to access network resources.

In some embodiments, if a condition is not met, the RADIUS server, AS1 344, sends an Access-Reject response indicating that the request from NAS client 320 is invalid. The RADIUS server may include a message in the Access-Reject response that may be displayed to the user. No other attributes are permitted in the Access-Reject response.

In other embodiments, as in the example depicted in FIG. 3, if all conditions are met and RADIUS server AS1 344 wishes to issue a challenge to which user C1 314 must respond, RADIUS server AS1 344 sends Access-Challenge 334 at time $t_4$, which is received by NAS client 320 at time $t_5$. In some embodiments, Access-Challenge 334 includes a message 324 (which is transmitted from NAS client 320 to user C1 314 at time $t_6$, and which is received by user C1 314 at time $t_7$) to be displayed to the user C1 314 prompting for a response 326 (which is transmitted from user C1 314 to NAS client 320 at time $t_8$, and which is received by NAS client 320 at time $t_9$) to the challenge.

NAS client 320, upon receiving response 326 from user C1 314, transmits Access-Request 336 at time $t_{10}$, which is the same as original Access-Request 332 but has a new request identifier. In Access-Request 336, the user password attribute is replaced by user C1 314's response (encrypted) to RADIUS server AS1 344's challenge. Access-Request 336 may further include a state attribute if presented in Access-Challenge 334.

Access-Request 336 is received by RADIUS server AS1 344 at time $t_{11}$. After that, RADIUS server AS1 344 can respond to this new Access-Request 336 with an Access-Accept, an Access-Reject, or another Access-Challenge. In the illustrated example, AS1 314 transmits, at time $t_{12}$, Access-Accept 338, which is received by NAS client 320 at time $t_{13}$. If all conditions are met, the list of configuration information for the user C1 314 is placed into Access-Accept 338. The configuration information includes the type of service, for example, Serial Line Internet Protocol (SLIP), Point-to-Point Protocol (PPP), login user, and all other necessary information to deliver the desired service. For SLIP and PPP, this may include IP address, subnet mask, MTU, desired compression, and desired packet filter identifiers, etc. For character mode users, this may include, for example, desired protocol and host.

In challenge/response authentication as illustrated by elements 338 and 328 in FIG. 3, the user usually is given an unpredictable number and challenged to encrypt it and to reply with the result. Authorized users are equipped with special devices, such as smart cards, or software that facilitate calculation of the correct response. Unauthorized users, lacking the appropriate devices or software and lacking knowledge of the secret key necessary to emulate such devices or software, can only guess at the response. Accordingly, Access-Challenge 338 typically contains a reply message 328, including a challenge to be displayed to the user, such as a numeric value unlikely to be repeated. Preferably, this is obtained from an external server that knows what type of authenticator should be in the possession of the authorized user and can therefore choose a random or non-repeating pseudo-random number of an appropriate radix and length. The user then responds to the challenge with the user's client device or software, which calculates a response based on what the user enters. The client device then forwards the response to the RADIUS server via a new Access-Request. If the response matches the expected response, the RADIUS server replies with an Access-Accept (not shown). Otherwise, the RADIUS server replies with an Access-Reject.

Outstanding Requests

Figure 4:
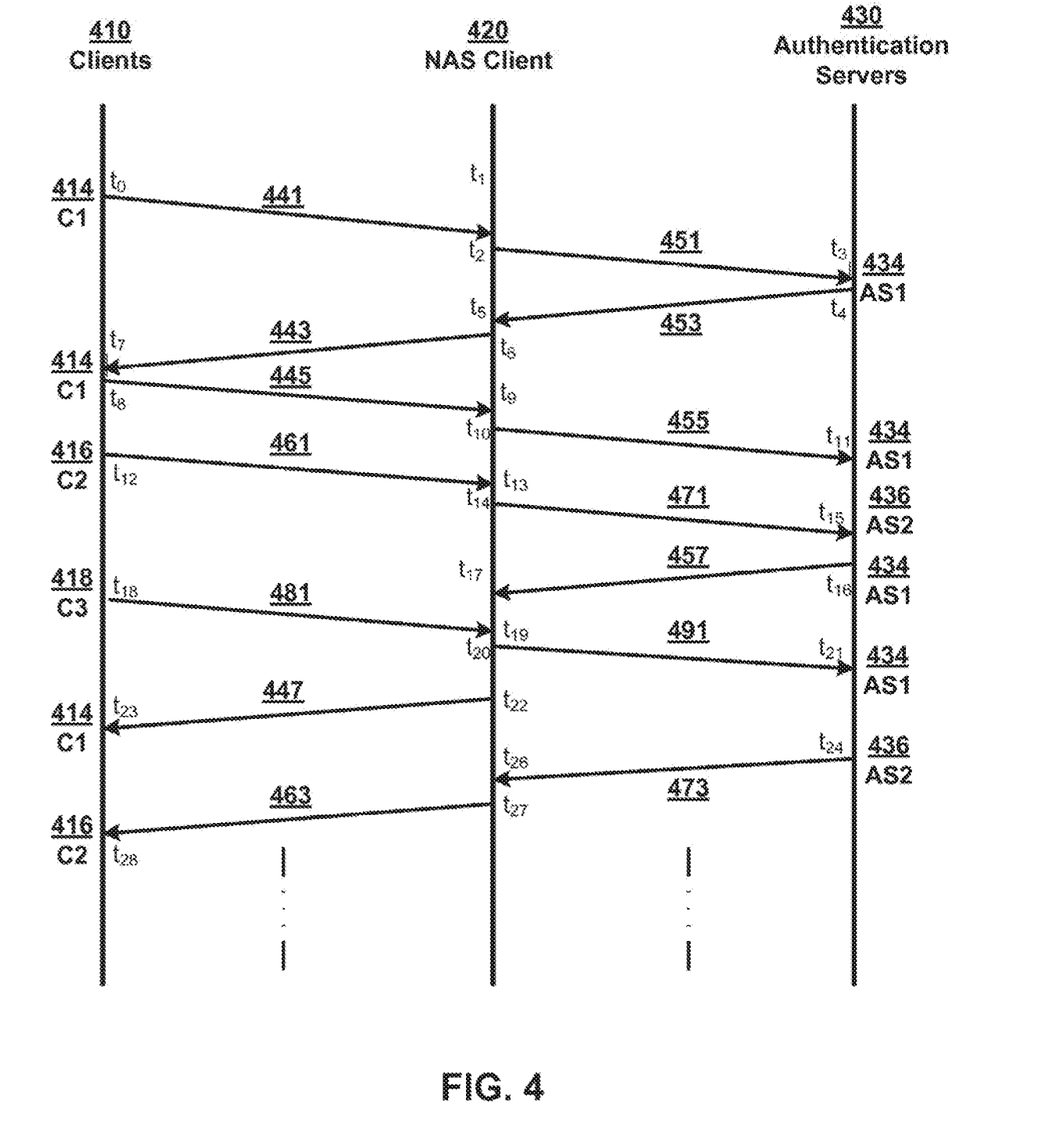
FIG. 4 is a sequence diagram illustrating dynamic transaction-persistent server load balancing according to embodiments of the present disclosure.

FIG. 4 illustrates dynamic transaction-persistent server load balancing according to embodiments of the present disclosure. In this example, clients 410 communicate to a group of authentication servers 430 through NAS client 420. NAS client 420 can be an access point, a controller, a switch, or any other device, which is coupled to authentication servers 430 through network, and which is capable of processing user and/or device authentication for clients 410. For illustrative purposes only, the system depicted in FIG. 4 comprises clients 410, including three users and/or devices, namely C1 414, C2 416, and C3 418, NAS client 420, and two authentication servers 430, including AS1 434 and AS2 436. However, the disclosed system should not be restricted to the configuration and network setup as described in FIG. 4.

During operations, C1 414 transmits request 441 at time $t_0$ to NAS client 420, which receives request 441 at time $t_1$. NAS client 420 creates and transmits Access-Request 451 to AS1 434 at time $t_2$, which is received by AS1 434 at time $t_3$. In response, AS1 434 transmits Access-Challenge 453 at time $t_4$ to NAS client 420. After receiving Access-Challenge 453 at time $t_5$, NAS client 420 transmits challenge 443 to C1 414 at time $t_6$. C1 414 receives challenge 443 at time $t_7$, and responds with reply message 445 at time $t_8$. Reply message 445 is received by NAS client 420 at time $t_9$. Subsequently, NAS client 420 creates new Access-Request 455 including the reply, and transmits new Access-Request 455 to AS1 434 at time $t_{10}$. AS1 434 receives Access-Request 455 at time $t_{11}$. The sequence of communication exchanges between time $t_0$ and time $t_1$ described above in reference to FIG. 4 is comparable to the sequence of communication exchanges between time $t_0$ and time $t_{11}$ as described in FIG. 3. Note that because Access-Request 451 and Access-Request 455 are in the same transaction, the disclosed load balancing system will not load balance them and will transmit both requests to the same authentication server, thereby making both requests transaction-persistent.

At time $t_{12}$, a second user C2 416 transmits request 461 from a new transaction to NAS client 420, which receives request 461 at time $t_{13}$. In one embodiment, NAS client 420 considers load balancing requests from clients 410, and determines authentication server allocation whenever it receives a first request from a new transaction, e.g., at or after time $t_{13}$.

NAS client 420 makes the determination based on numbers of outstanding requests at AS1 and AS2 respectively. Because after time $t_{10}$, AS1 434 has 1 previously transmitted request (i.e., Access-Request 455) from NAS client 420, and the request has neither expired nor been matched to a response received from AS1 434, the number of outstanding request at AS1 434 before time $t_{13}$ is 1, and the number of outstanding request at AS2 436 is 0 (i.e., the initialized value). Thus, the system will determine to transmit all requests associated with the new transaction initialized by user C2 416 to AS2, including Access-Request 471.

Access-Request 471 is transmitted from NAS client 420 at $t_{14}$ and received by AS2 436 at $t_{15}$. Therefore, subsequent time $t_{14}$ and prior to time $t_{17}$ when Access-Accept 457 is received by NAS client 420 from AS1 434 (which transmits Access-Accept 457 at time $t_{16}$), the number of outstanding request at AS1 434 is 1 (Indicating Access-Request 455), and the number of outstanding request at AS2 436 is also 1 (indicating Access-Request 471). If a new client request from a new transaction is received during this time period, NAS client 420 can select either AS1 434 or AS2 436 to transmit requests associated with the new transaction in accordance with the load balancing algorithm described herein. However, because Access-Accept 457 is received by NAS client 420 at $t_{17}$, and also because the identifier in Access-Accept 457 matches the identifier in Access-Request 455, after NAS client 420 receives Access-Accept 457 at time $t_{17}$, the number of outstanding requests at AS1 434 will be updated to 0. Therefore, after time $t_{17}$, NAS client 420 will infer that AS1 434 has a higher relative server capacity than AS2 436.

Next, user C3 418 transmits new request 481 from another new transaction at time $t_{18}$ to NAS client 420. New request 481 is received by NAS client 420 at time $t_{19}$. Note that, after time $t_{17}$, AS1 434 is associated with 0 outstanding request and AS2 436 is associated with 1 outstanding request, namely Access-Request 471. Therefore, the disclosed system will determine to transmit Access-Request 491 corresponding to the other new transaction from C3 418 to AS1 434, because AS1 434 has fewer number of outstanding requests at the time of load balance determination.

As illustrated in FIG. 4, Access-Request 491 is transmitted by NAS client 420 at time $t_{20}$, and received by AS1 434 at time $t_{21}$. Also, after receiving Access-Accept 457 at time $t_{17}$, NAS client 420 transmits corresponding response 447 to user C1 414 at $t_{22}$. Response 447 is received by user C1 414 at time $t_{23}$.

In this example, after AS2 436 verifies NAS client 432's ID and/or the NAS client's port ID, as well as user name and password supplied by user C2 416 in request 461, AS2 436 determines that one or more conditions in the authentication database are not met. As a result, AS1 434 sends Access-Reject 473 indicating that request 471 from NAS client 420 is invalid at time $t_{24}$. NAS client 420 receives Access-Reject 473 at time $t_{26}$, and transmits reply 463 to user C2 416 at $t_{27}$. Reply 463 informing C2 416 of the rejection is received by C2 416 at time $t_{26}$.

Figure 5:
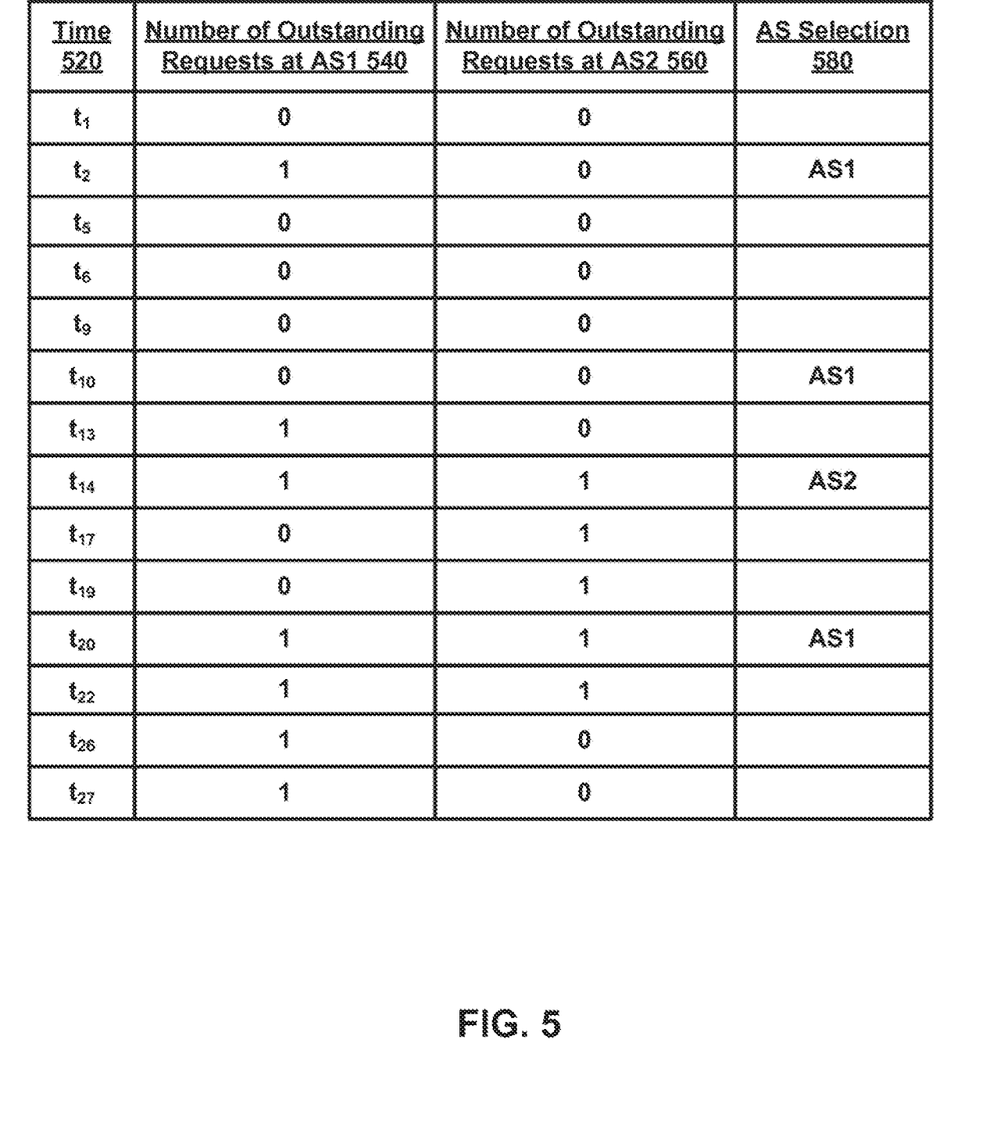
FIG. 5 is a diagram illustrating dynamic transaction-persistent server load balancing based on outstanding requests at real-time corresponding to the case scenario illustrated in FIG. 4 according to embodiments of the present disclosure.

FIG. 5 shows a summary of the number of outstanding requests at AS1 540 and the number of outstanding requests at AS2 560 at different time points 520. FIG. 5 further shows AS selection 580 based at least on the relative capacities of AS1 and AS2, and transmission latencies between NAS clients and AS1 and/or AS2 at different time points.

In this embodiment, the variables indicating outstanding requests at authentication servers are initialized to zero. In this example, the variable for an authentication server increases when a new request is transmitted from a NAS client to the authentication server. The variable decreases when a previously transmitted request expires, or when a response, which is corresponding to a non-expired previously transmitted request, is received by the NAS client from the authentication server. However, in another embodiment, the variable for the authentication server decreases when a new request is transmitted from the NAS client to the authentication server. The variable increases when a previously transmitted request expires, or when a response, which is corresponding to a non-expired previously transmitted request, is received by the NAS client from the authentication server. Further, it should be noted that any methods capable of tracking incremental and/or decremental changes, or progressions and/or regressions, may be used for tracking purposes. The metrics may be, for example, numerical, alphabetical, or categorical.

It should be further noted that the relative server capacities and transmission latencies are dynamically inferred from the numbers of outstanding requests at different authentication servers in the server group. For example, during the time period between time $t_{13}$ and time $t_{14}$, because the number of outstanding request at AS1 540 is 1, and the number of outstanding request at AS2 560 is 0, the disclosed system can infer that AS2 has a higher capacity and lower transmission latency than AS1. Thus, the system will identify AS2 as the authentication server for processing requests associated with the new transaction initiated by C2, and transmits the first request from the new transaction at time $t_{14}$ to AS2.

As another example, during time period between time $t_{17}$ and time $t_{19}$, the number of outstanding request at AS1 540 is 0, and the number of outstanding request at AS2 560 is 1, the system therefore infers that AS1 has a higher capacity and lower transmission latency than AS2. Accordingly, the system will select AS1 for authentication of requests associated with the new transaction initiated by C3, and transmits the first request from the new transaction at time $t_{20}$ to AS1.

Further, it should be noted that, the comparison of the number of outstanding requests may be based on concrete values, statistical values, categorical classifications, etc. In some embodiments, the system may be configured to identify the authentication server with fewest outstanding requests based the comparison. In other embodiments, the system may be configured to identify the authentication server with relatively few, but not necessarily the fewest, outstanding requests based on the comparison. Moreover, requests generally include many different types of communication transmissions from the NAS client to authentication servers. In the RADIUS protocol example, the requests can include, but are not limited to, Access-Request and Accounting-Request. In some embodiments, the system can be used to perform load balance among multiple server farms. Each server farm includes a group of servers coupled through a proxy server to a NAS client. The NAS client will transmit requests associated with a new transaction based on comparison of numbers of outstanding requests associated with each proxy server.

Dynamic Transaction-Persistent Load Balancing Process

Figure 6A:
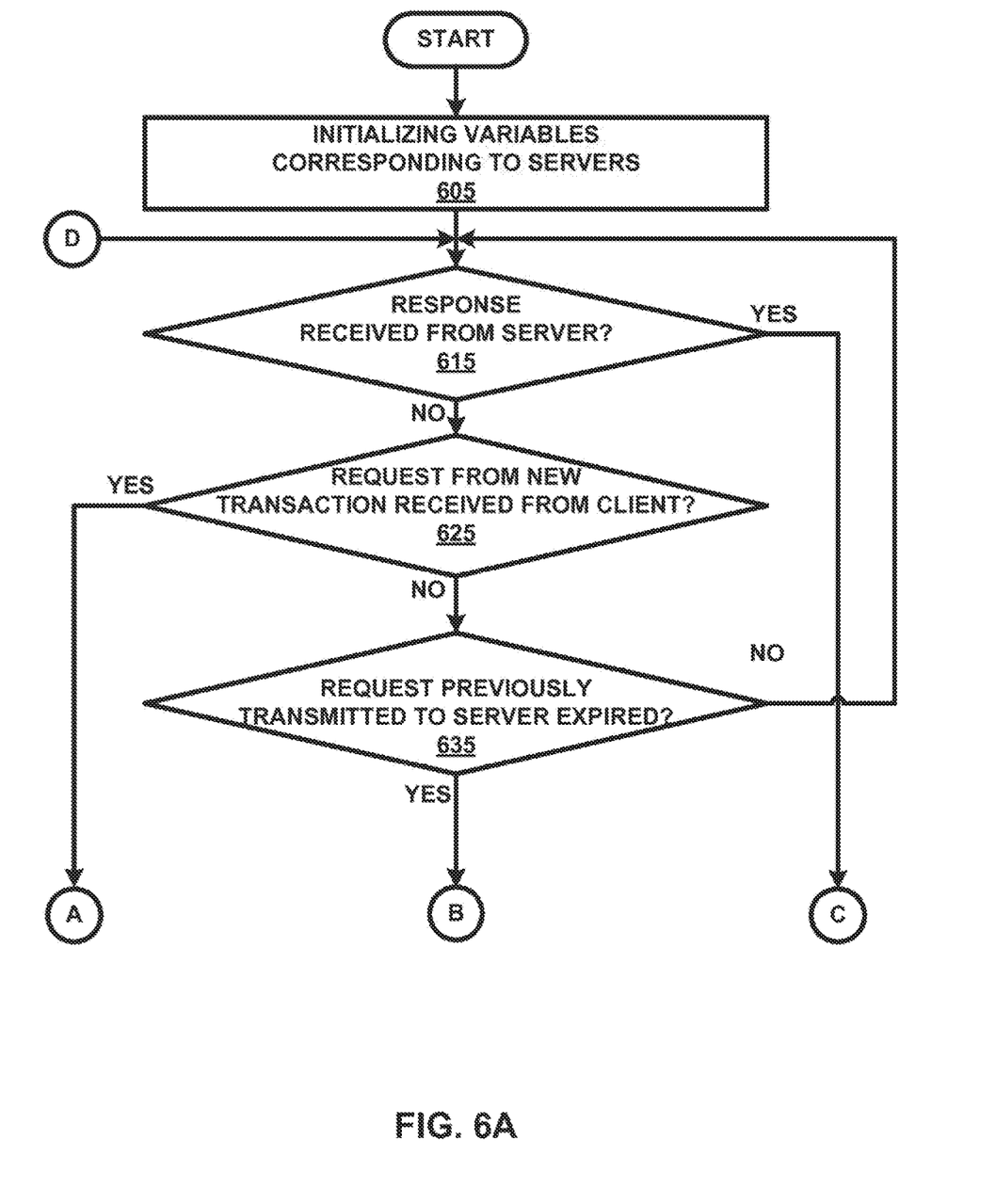
FIG. 6A-6B are flowcharts illustrating the process of dynamic transaction-persistent server load balancing according to embodiments of the present disclosure.
Figure 6B:
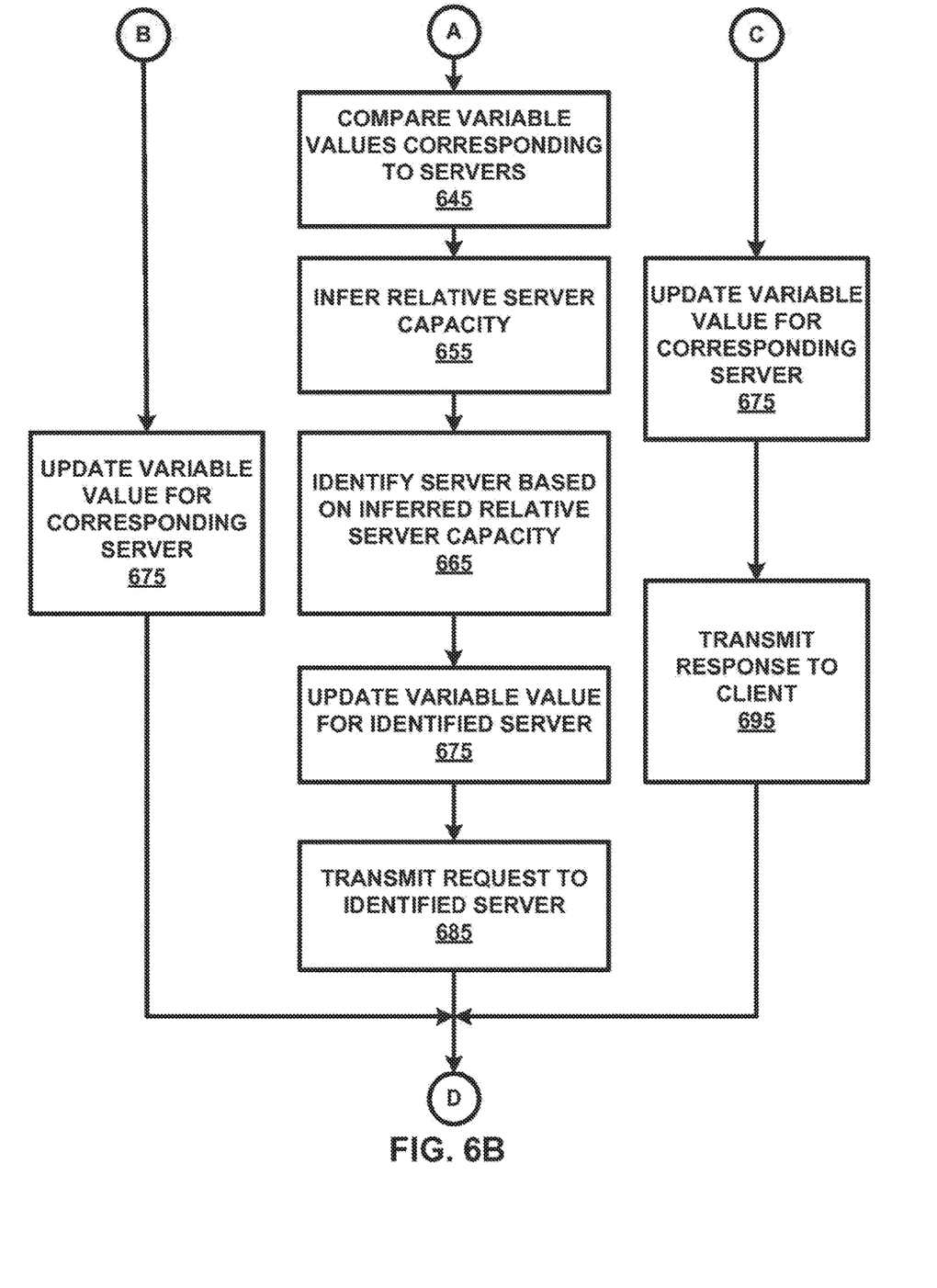

FIG. 6A-6B are flowcharts illustrating the process of dynamic transaction-persistent server load balancing. During operations, the disclosed system initializes variables corresponding to servers (operation 605) to an initial value. Note that separate variables are maintained for different servers.

Further, the system determines whether a response is received from a corresponding server (operation 615). If so, the system updates the variable for the corresponding server (operation 675), and subsequently transmits a response to client (operation 695). If not, the system continues with additional determinations.

For example, the system can determine whether a request from a new transaction is received from a client (operation 625). If so, the system compares current values of the variables corresponding to the servers (operation 645). The system can then infer the relative capacities of the servers, and transmission latencies between the NAS client and the authentication servers based on the comparison (operation 655). For example, a server with fewer outstanding requests than another server is inferred to have a higher relative capacity than the other server at a specific time, because the server is presumed to have high processing capacity and low transmission latency based on the low number of outstanding requests. Next, the system identifies and selects a server based on inferred relative capacities of the servers and transmission latencies (operation 665). The system also updates the variable for the identified server (operation 675), and transmits the request to identified server (operation 685).

In addition, the system can determine whether a request that has been previously transmitted to a corresponding server is expired (operation 635). If so, the system will update the variable associated with the corresponding server (operation 675).

Dynamic Transaction-Persistent Load Balancing System

Figure 7:
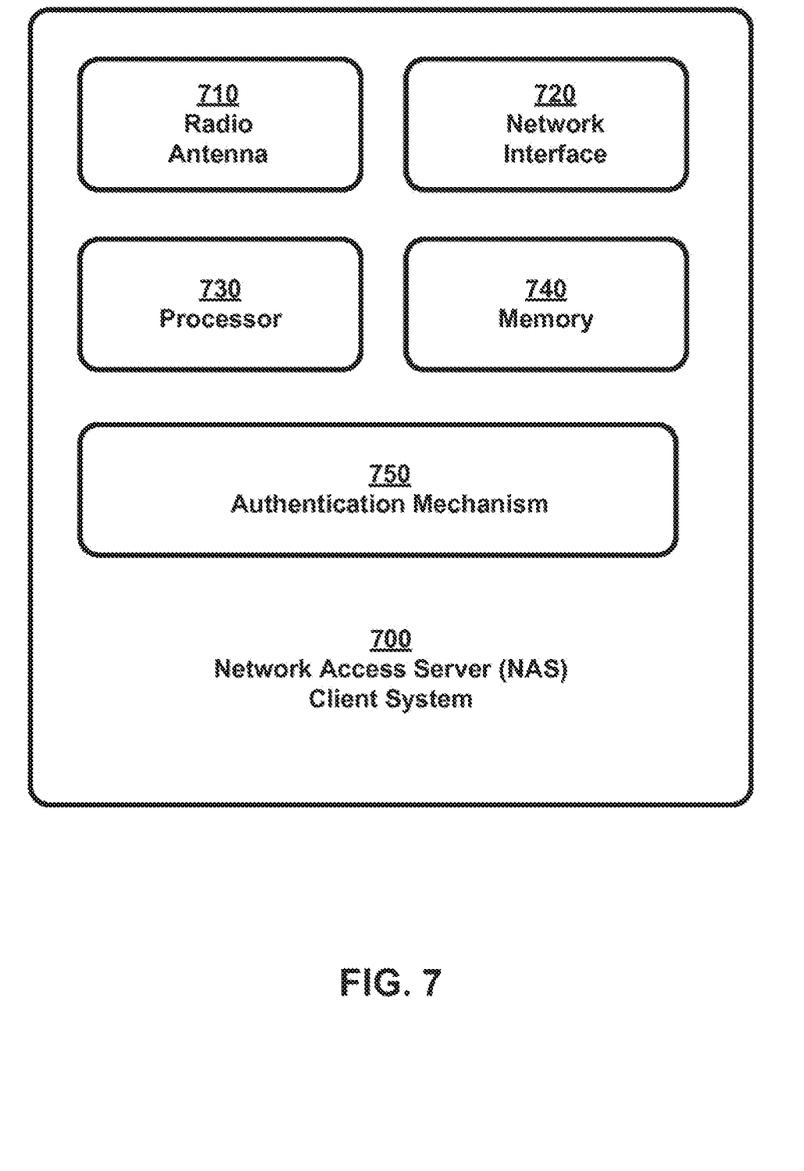
FIG. 7 is a block diagram illustrating a Network Access Server (NAS) client system capable of performing dynamic transaction-persistent server load balancing according to embodiments of the present disclosure.

FIG. 7 is a block diagram illustrating a Network Access Server (NAS) client system capable of performing dynamic transaction-persistent server load balancing in a network. Network Access Server (NAS) system 700 includes at least one or more radio antennas 710 capable of either transmitting or receiving radio signals or both, a processor 730 capable of processing computing instructions, a network interface 720 capable of communicating to a wired or wireless network, a memory 740 capable of storing instructions and data, and an authentication mechanism 750. System 700 may be used as a client system, or a server system, or may serve both as a client and a server in a distributed system or a cloud system.

Radio 710 may be any combination of known or convenient electrical components, including but not limited to, transistors, capacitors, resistors, multiplexers, wiring, registers, diodes or any other electrical components known or later become known.

Network interface 720 can be any communication interface, which includes but is not limited to, a modem, token ring interface, Ethernet interface, wireless 802.11 interface, cellular wireless interface, satellite transmission interface, or any other interface for coupling network devices.

Processor 730 can include one or more microprocessors and/or network processors. Memory 740 can include storage components, such as, Dynamic Random Access Memory (DRAM), Static Random Access Memory (SRAM), etc.

Authentication mechanism 750 is coupled to processor 730 and memory 740 to perform the process of dynamic transaction-persistent server load balancing as describe in the present disclosure.

The present disclosure may be realized in hardware, software, or a combination of hardware and software. The present invention may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in nontransitory fashion in a computer-readable storage medium, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "access point" (AP) generally refers to receiving points for any known or convenient wireless access technology which may later become known. Specifically, the term AP is not intended to be limited to 802.11 APs. APs generally function to allow wireless devices to connect to a wired network via various communications standards.

As used herein, the term "mechanism" generally refers to a component of a system or device to serve one or more functions, including but not limited to, software components, electronic components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

What is claimed is:

1. A method comprising:
   receiving, at a device in a network, a client request associated with a new transaction;
   dynamically inferring, by the device, relative capacities of a plurality of servers by comparing outstanding requests regarding each of the plurality of servers regardless of absolute capacity of each of the plurality of servers, the outstanding requests comprising all previously transmitted requests to each of the plurality of servers that have not yet expired and for which no responses corresponding to the previously transmitted requests have been received;
   maintaining, at the device, a set of variables corresponding to the plurality of servers that are coupled to the device in a network, wherein each variable of the set of variables indicates a number of the outstanding requests transmitted from the device to a respective server in the plurality of servers;
   responsive to receiving the client request, further dynamically inferring, by the device, in addition to the relative capacities of the servers, transmission latencies between the device and the servers based on a comparison of current values of each of the variables corresponding to the servers;
   selecting a server from the plurality of servers based on the inferred relative capacities and transmission latencies to process requests associated with the new transaction; and
   transmitting, from the device to a selected server, a request corresponding to the client request.

2. The method of claim 1, wherein dynamically inferring the relative capacities comprises:
   identifying, by the device, a server which is associated with high capacity and low transmission latency between the device and the server relative to one or more other servers.

3. The method of claim 1, wherein maintaining the set of variables comprises:
   responsive to receiving, at the device, a response from a server corresponding to a previously transmitted request to the server, updating the value of the variable corresponding to the server based on decreased number of outstanding requests;
   responsive to the previously transmitted request to the server being expired, updating the value of the variable corresponding to the server based on decreased number of outstanding requests; and
   responsive to transmitting a respective request from the device, updating the value of the variable corresponding to the corresponding server based on increased number of outstanding requests.

4. The method of claim 1, wherein identifying the server comprises identifying the server associated with highest capacity or lowest transmission latency between the device and the servers.

5. The method of claim 1, wherein subsequent requests associated with the new transaction are transmitted to the server corresponding to previously transmitted request associated with the new transaction maintaining transaction persistence regardless of load balanced server selection based on the inferred relative capacities and transmission latencies.

6. The method of claim 5, wherein the servers are authentication servers, and wherein the transactions are authentication transactions.

7. The method of claim 6, wherein the outstanding requests comprise one or more of access requests and accounting requests to the servers.

8. The method of claim 1, wherein the outstanding requests correspond to a plurality of transactions.

9. The method of claim 8, wherein the device is a Network Access Server (NAS) client, wherein the authentication servers are Remote Authentication Dial-In User Service (RADIUS) severs, and wherein the authentication transactions are performed using an authentication method in compliance with Electrical and Electronics Engineers (IEEE) 802.1 X standard.

10. The method of claim 9, wherein each of the plurality of severs is a proxy RADIUS server to a respective server farm, and wherein requests associated with the same IEEE 802.1 X transaction are transmitted to the same server farm through the corresponding proxy RADIUS server.

11. The method of claim 1, wherein the device is one of an access point and a controller which is coupled to one or more access points.

12. A system comprising:
a processor;
a memory;
a receiving mechanism coupled to the processor and the memory, the receiving mechanism receiving a client request associated with a new transaction;
an inferring mechanism coupled to the processor and the memory, the inferring mechanism inferring relative capacities of a plurality of servers by comparing outstanding requests regarding each of the plurality of servers regardless of absolute capacity of each of the plurality of servers, the outstanding requests comprising all previously transmitted requests to each of the plurality of servers that have not yet expired and for which no responses corresponding to the previously transmitted requests have been received;
an authentication mechanism, coupled to the processor and the memory, that:
maintains a set of variables corresponding to the plurality of servers that are coupled to the device in a network, wherein each variable of the set of variables indicates a number of the outstanding requests transmitted from the device to a respective server in the plurality of servers;
wherein, responsive to receiving the client request, the inferring mechanism further:
determines, in addition to the relative capacities of the servers, transmission latencies between the device and the servers based on a comparison of current values of each of the variables corresponding to the servers; and
identifies a server which is associated with high capacity and low transmission latency between the device and the server relative to one or more other servers;
a selecting mechanism coupled to the processor and the memory, the selecting mechanism selecting a server from the plurality of servers based on the inferred relative capacities and transmission latencies to process requests associated with the new transaction; and
a transmitting mechanism coupled to the processor and the memory, the transmitting mechanism transmitting, to a selected server, a request corresponding to the client request.

13. The system of claim 12, wherein the authentication mechanism, while maintaining the set of variables, further:
updates the value of the variable corresponding to the server based on decreased number of outstanding requests responsive to receiving a response from a server corresponding to a previously transmitted request to the server;
updates the value of the variable corresponding to the server based on decreased number of outstanding requests responsive to the previously transmitted request to the server being expired; and
updates the value of the variable corresponding to the corresponding server based on increased number of outstanding requests responsive to transmitting a respective request from the device.

14. The system of claim 12, wherein the selecting mechanism selects the server associated with highest capacity or lowest transmission latency between the device and the servers.

15. The system of claim 12, wherein subsequent requests associated with an initialized transaction are transmitted to the server corresponding to previously transmitted request associated with the initialized transaction maintaining transaction persistence regardless of load balanced server selection based on the inferred relative capacities and transmission latencies.

16. The system of claim 12, wherein the outstanding requests correspond to a plurality of transactions.

17. The system of claim 16, wherein the device is a Network Access Server (NAS) client, wherein the servers are Remote Authentication Dial-In User Service (RADIUS) severs, and wherein the transactions are authentication transactions performed using an authentication method in compliance with Electrical and Electronics Engineers (IEEE) 802.1 X standard.

18. A non-transitory computer-readable storage medium storing embedded instructions to perform a method, wherein the method comprises:
receiving a client request associated with a new transaction;
dynamically inferring relative capacities of a plurality of servers by comparing outstanding requests regarding each of the plurality of servers regardless of absolute capacity of each of the plurality of servers, the outstanding requests comprising all previously transmitted requests to each of the plurality of servers that have not yet expired and for which no responses corresponding to the previously transmitted requests have been received;
dynamically inferring, responsive to receiving the client request, and in addition to the relative capacities of the servers, transmission latencies between the device and the servers based on a comparison of current values of variables corresponding to the servers;
maintaining a set of variables corresponding to the plurality of servers, wherein each of the variables indicates a number of the outstanding requests transmitted to a respective server in the plurality of servers;
selecting a server from the plurality of servers based on the inferred relative capacities to process requests associated with the new transaction; and transmitting, to the selected server, a request corresponding to the client request.

\* \* \* \* \*